US009632302B2

(12) United States Patent
Jaffe et al.

(10) Patent No.: US 9,632,302 B2
(45) Date of Patent: Apr. 25, 2017

(54) ADJUSTABLE COLLIMATOR FOR COUPLING A LIGHT GUIDE TO A MICROSCOPE

(71) Applicant: Lumencor, Inc., Beaverton, OR (US)

(72) Inventors: Claudia B. Jaffe, Portland, OR (US); Steven M. Jaffe, Portland, OR (US)

(73) Assignee: LUMENCOR, INC., Beaverton, OR (US)

( * ) Notice: Subject to any disclaimer, the term of this patent is extended or adjusted under 35 U.S.C. 154(b) by 0 days.

(21) Appl. No.: 14/151,504

(22) Filed: Jan. 9, 2014

(65) Prior Publication Data

US 2014/0192405 A1    Jul. 10, 2014

Related U.S. Application Data

(60) Provisional application No. 61/750,465, filed on Jan. 9, 2013.

(51) Int. Cl.
*G02B 21/24* (2006.01)
*G02B 21/08* (2006.01)
*G02B 27/30* (2006.01)

(52) U.S. Cl.
CPC ............. *G02B 21/08* (2013.01); *G02B 27/30* (2013.01)

(58) Field of Classification Search
CPC .... G02B 21/24; G02B 21/025; G02B 21/248; G02B 21/06; G02B 21/0004; G02B 21/10; G02B 21/082
USPC ................................. 359/385–390, 819, 823
See application file for complete search history.

(56) References Cited

U.S. PATENT DOCUMENTS

| 5,933,274 | A | * | 8/1999 | DeSimone | G02B 21/06 359/390 |
| 5,991,090 | A | * | 11/1999 | Strahle | G02B 15/173 359/376 |
| 7,561,327 | B2 | * | 7/2009 | Riedmann | G02B 26/0875 359/379 |
| 2011/0235171 | A1 | * | 9/2011 | Dohi | G02B 21/08 359/385 |

* cited by examiner

*Primary Examiner* — Stephone B Allen
*Assistant Examiner* — Rahman Abdur
(74) *Attorney, Agent, or Firm* — Tucker Ellis LLP

(57) ABSTRACT

A solid state illumination system is provided as a replacement for conventional arc light, metal halide and Xenon white-light sources for applications in life sciences including, microscopy, fluorescence microscopy, and endoscopy. The solid state illumination system generates high quality white light output from LED light sources. In an embodiment, the solid state illumination system is coupled to a microscope using a liquid light guide. The liquid light guide is coupled to a microscope using an adjustable collimator which optimizes the light output for input to the optical train of the microscope.

18 Claims, 16 Drawing Sheets

FIG. 3A
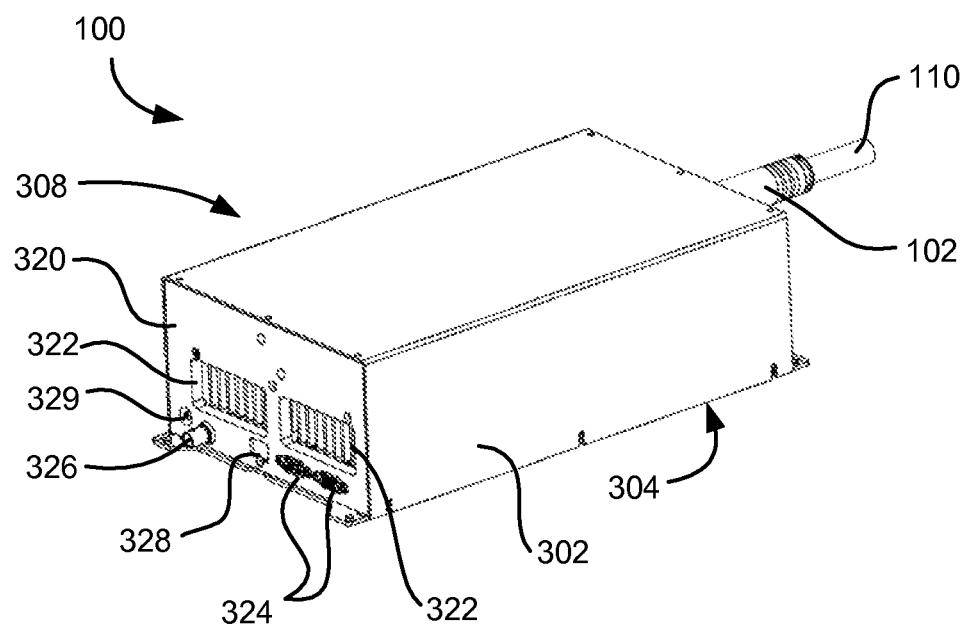
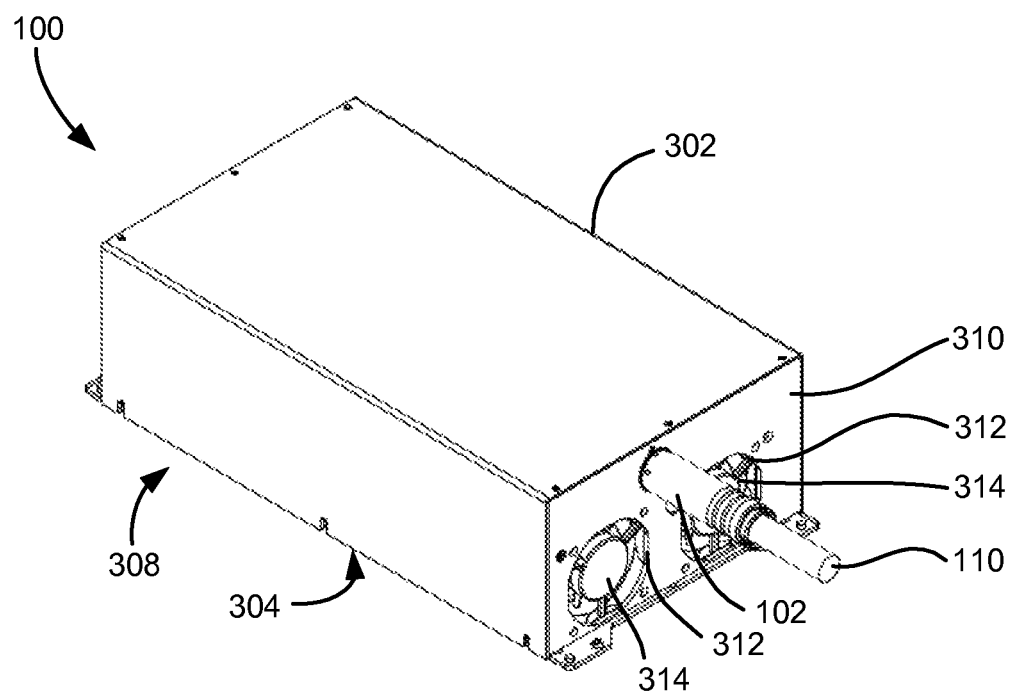
FIG. 3B

FIG. 4C
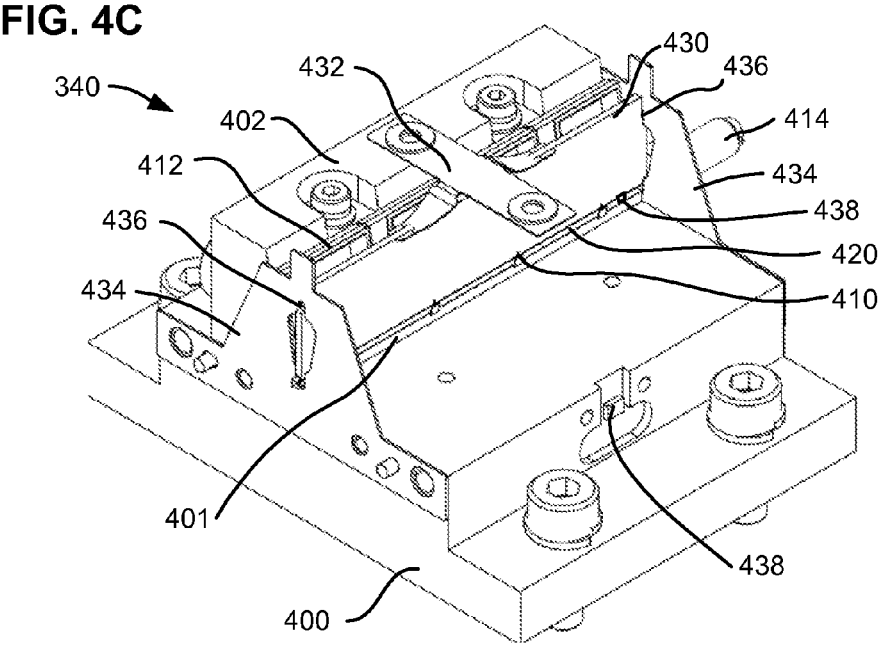
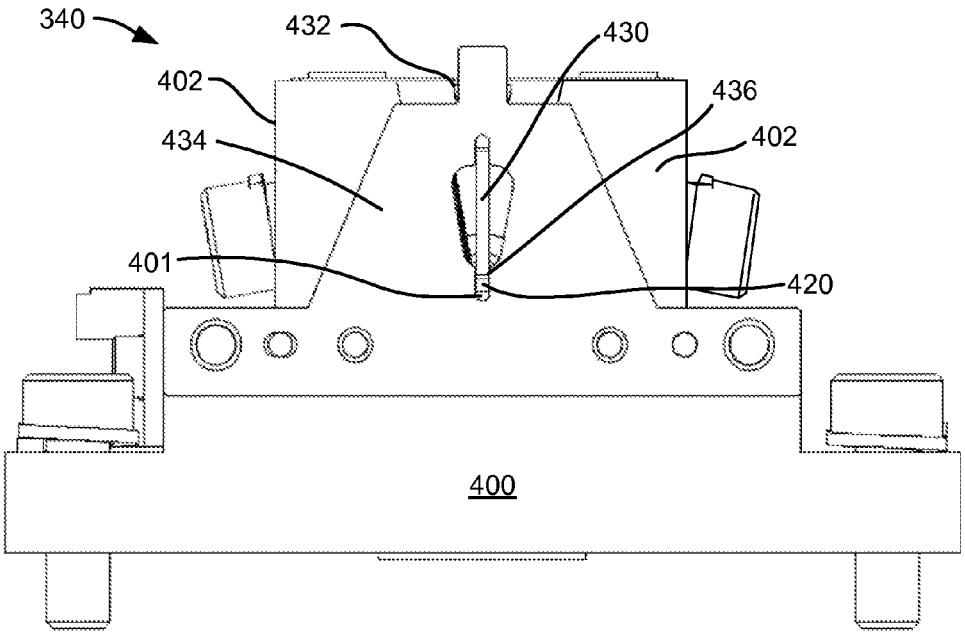
FIG. 4D

FIG. 4E
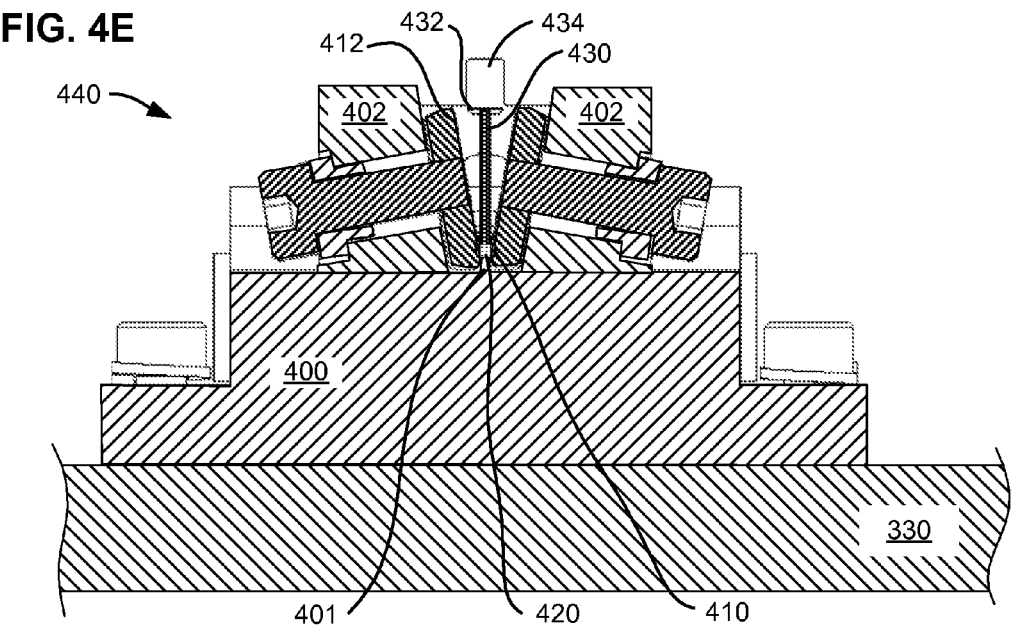
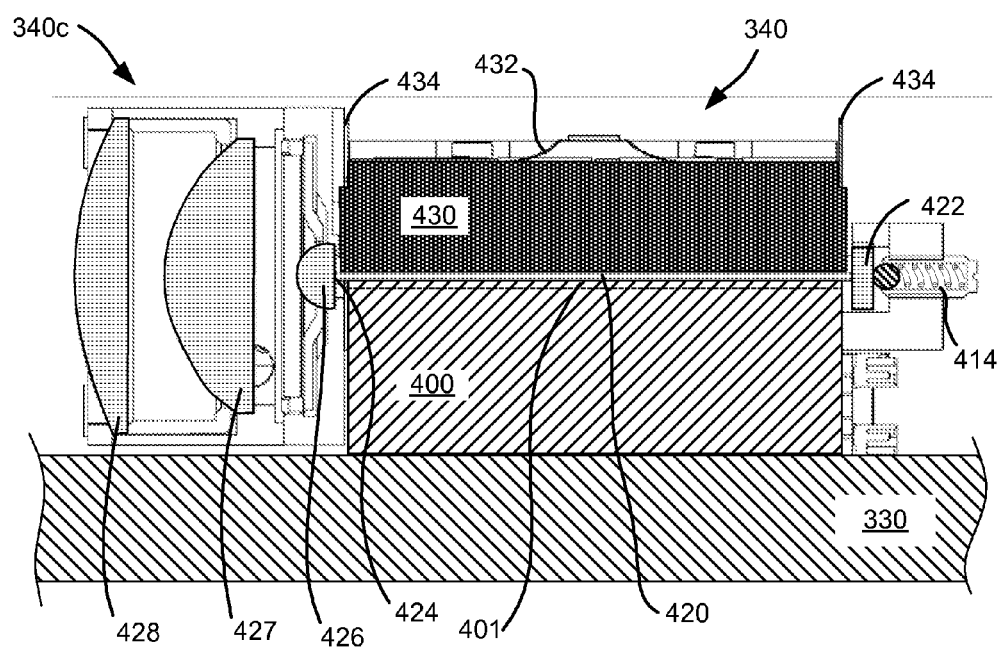
FIG. 4F

ADJUSTABLE COLLIMATOR FOR COUPLING A LIGHT GUIDE TO A MICROSCOPE

CLAIM OF PRIORITY

This present application claims priority to U.S. Provisional Patent Application No. 61/750,465, filed Jan. 9, 2013, entitled "ADJUSTABLE COLLIMATOR FOR COUPLING A LIGHT GUIDE TO A MICROSCOPE" which application is incorporated herein by reference in its entirety.

FIELD OF THE INVENTION

The present invention relates to lighting systems for life sciences applications including microscopy, endoscopy, and diagnostics and analytical applications. In particular the present invention relates to an adjustable collimator for coupling a light guide to a microscope.

BACKGROUND OF THE INVENTION

Light is a powerful tool in many of today's most widely used life science instruments, including microscopes, endoscopes, analytical instruments, diagnostic instruments, medical devices and miniaturized analyzers. Reliable high intensity, low cost light engines and accessory equipment are essential to the design and proliferation of these life science instruments.

SUMMARY OF THE INVENTION

The present invention provides a solid state light engine system for life science applications including variations suitable for use in microscopes. The solid state light engine is an inexpensive lighting solution, uniquely well suited to the production of safe, effective and commercially viable life science instruments and biomedical devices. The light engine system can provide powerful, pure, stable, inexpensive light across the visible spectrum. In an embodiment of the present invention, the light engine system is coupled to microscopes and/or other optical equipment using a light guide. The light guide transmits light from the output of the light engine to the input of the microscope. An adjustable collimator connects the light guide to a lamp housing port of the microscope. The adjustable collimator provides the light from the light guide in a form suitable for use in the microscope imaging pathway.

One embodiment of the present invention provides a light engine system which includes a solid state light engine, a light guide, and an adjustable collimator adapter to couple the light guide to a microscope. The collimator is adjustable to enable adjustability and superior performance for the coupling of the output of the solid state light engine to the microscope optical train.

Another embodiment of the present invention provides an adjustable collimator suitable for use with a variety of microscopes, light guides, and light engines.

A further embodiment of the present invention provides an adjustable collimator in combination with a microscope, wherein the collimator is adapted to couple a light guide to the microscope optical train.

Other objects and advantages of the present invention will become apparent to those skilled in the art from the following description of the various embodiments, when read in light of the accompanying drawings.

BRIEF DESCRIPTION OF THE FIGURES

Various embodiments of the present invention can be described in detail based on the following figures.

FIGS. 3A and 3B show external views of a solid state illumination engine according to an embodiment of the present invention.

FIG. 4C shows a partial perspective view of the light pipe engine of FIG. 4A.

FIG. 4D shows a partial end view of the light pipe engine of FIG. 4A.

FIGS. 4E and 4F show different sectional views of the light pipe engine of FIG. 4A.

Figure 1:
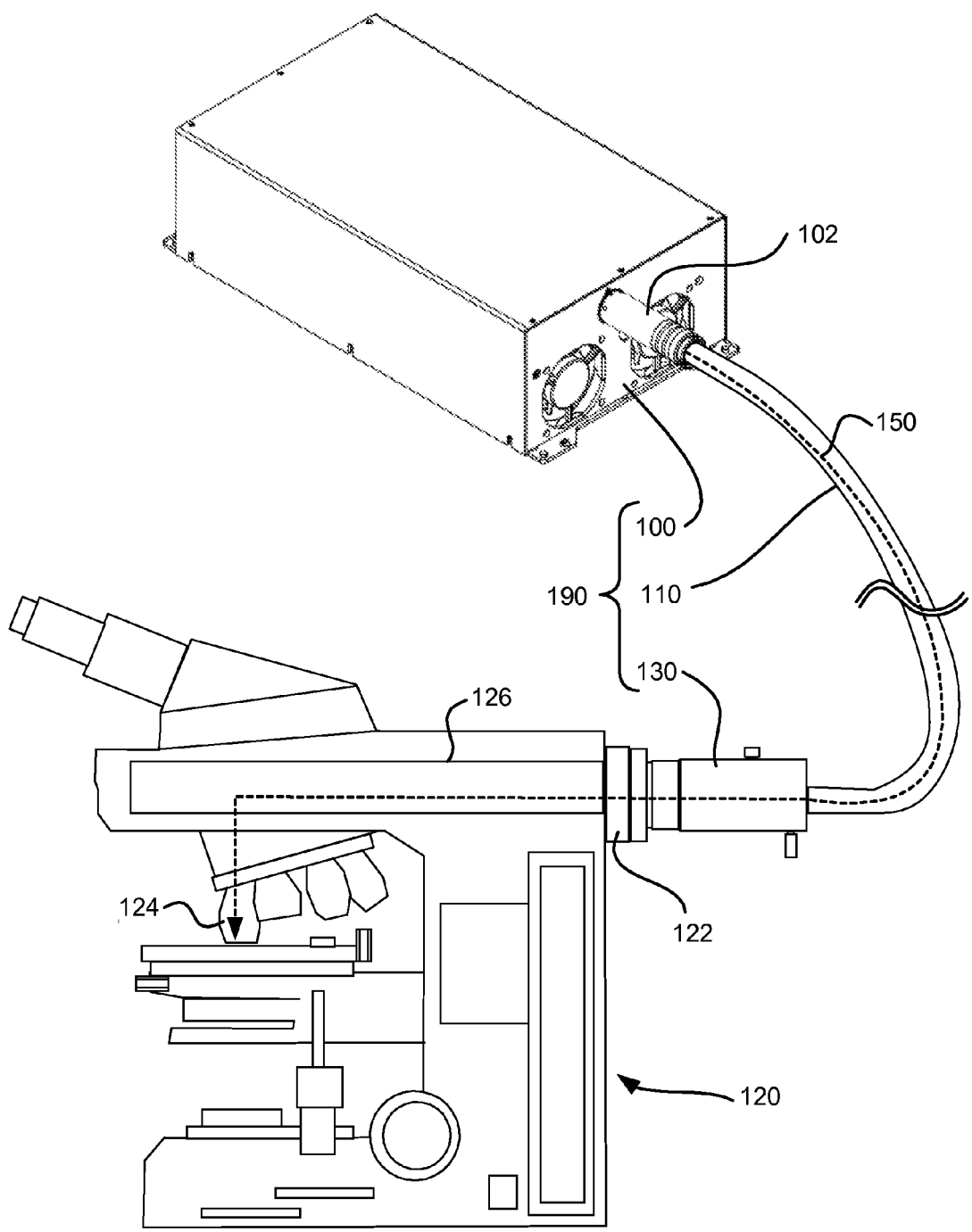
FIG. 1 shows an illumination system incorporating an adjustable collimator according to an embodiment of the invention.

In the figures common reference numerals are used to indicate like elements throughout the drawings and detailed description; therefore, reference numerals used in a drawing may or may not be referenced in the detailed description specific to such drawing if the associated element is described elsewhere. The first digit in a three digit reference numeral indicates the series of figures in which the referenced item first appears.

DETAILED DESCRIPTION OF THE INVENTION

FIG. 1 shows an illumination system (generally 190) incorporating an adjustable collimator according to an embodiment of the present invention. As shown in FIG. 1 illumination system 190 includes: a solid state illumination engine 100 which provides light output of a desired spectral distribution; a light guide 110; and an adjustable collimator 130. Solid state illumination engine 100 includes a light guide adapter 102 for connecting the output to light guide 110.

Light guide 110 comprises a liquid light guide or fiber optic light guide for transmitting light 150 from the solid state illumination engine 100 to the microscope 120. One end of a light guide 110 is inserted into the light guide adapter 102 of solid state illumination engine 100. The other end of light guide 110 is connected to adjustable collimator 130.

Microscope 120 includes a lamphouse mount 122 for attachment of a conventional Metal Halide or Xenon lamphouse (not shown). Adjustable collimator 130 is mounted to lamphouse mount 122 in place of the conventional Metal Halide or Xenon lamphouse. Adjustable collimator 130 passes the light 150 transmitted through light guide 110 from the solid state illumination engine 100 into the optical train 126 of microscope 120 and objective lens 124. Optical train 126 includes optical components, such as lenses, prisms and filters for providing light 150 to objective lens 124 of microscope 120. Adjustable collimator 130 includes features to enable superior performance of coupling the light 150 output by the solid state illumination engine 100 to the optical train 126 of microscope 120 as further described below.

Figure 2A:
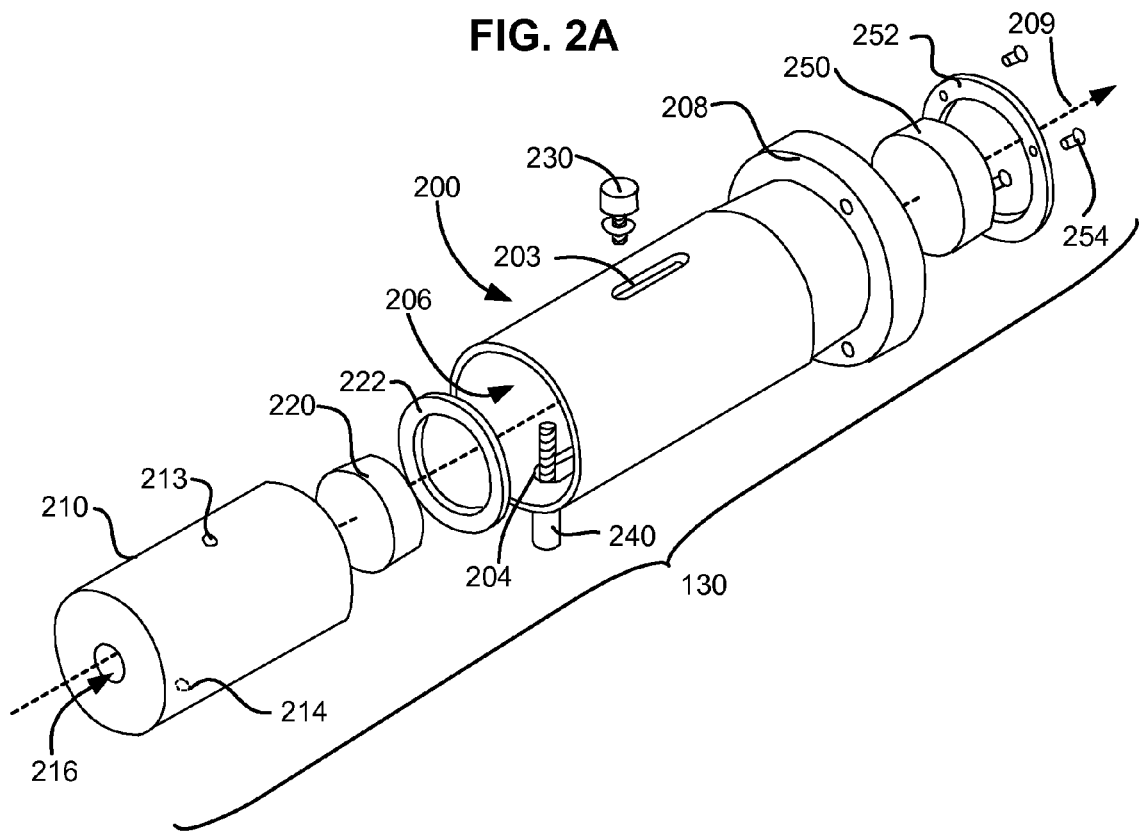
FIG. 2A shows an exploded view of components of an adjustable collimator according to an embodiment of the invention.
Figure 2B:
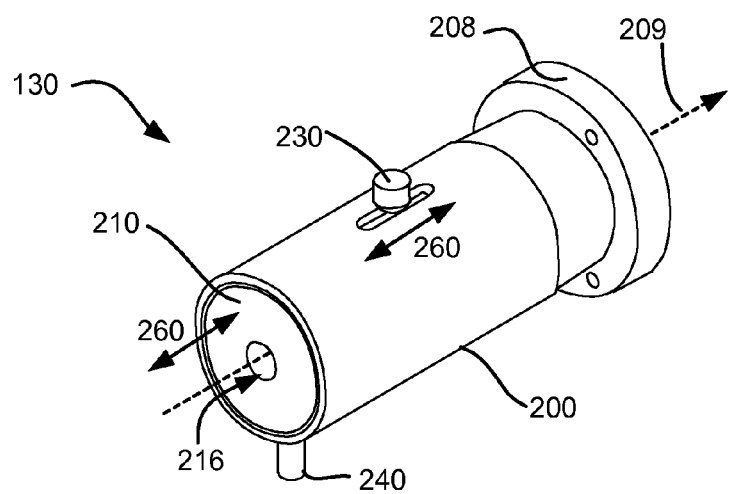
FIG. 2B shows a perspective view of an adjustable collimator according to an embodiment of the invention.
Figure 2C:
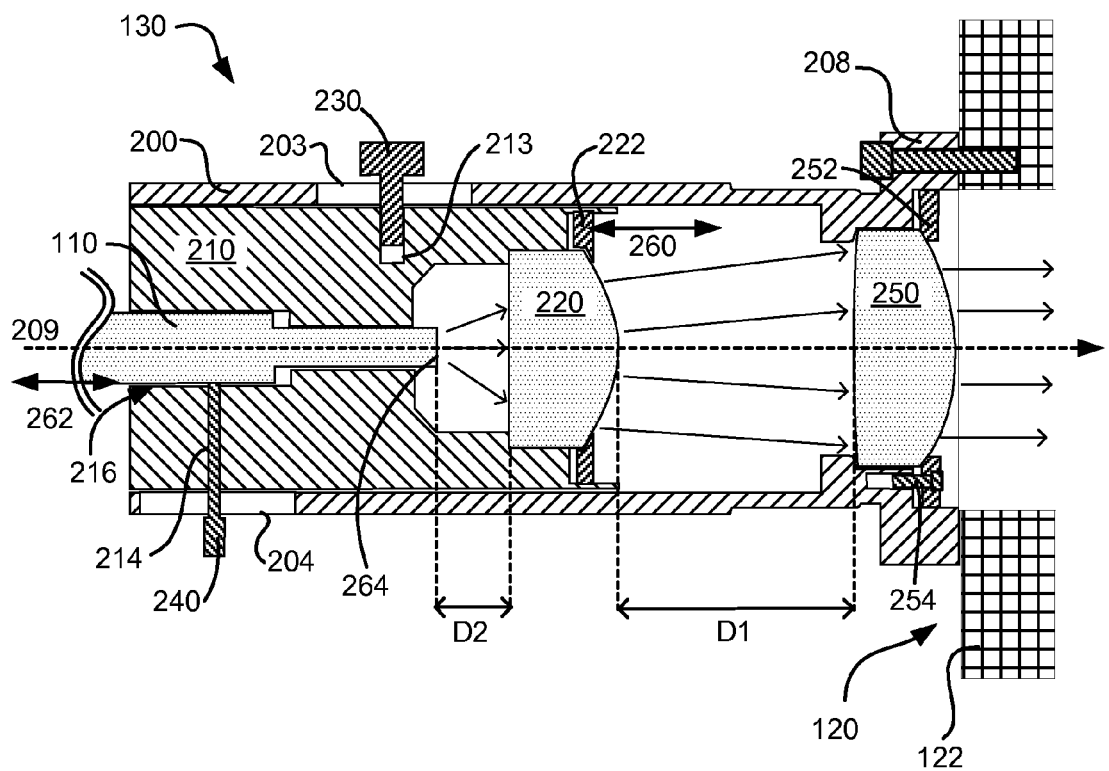
FIG. 2C shows a sectional view of an adjustable collimator according to an embodiment of the invention.

FIGS. 2A-2C show views of adjustable collimator 130 according to an embodiment of the invention. FIG. 2A shows an exploded view of components of adjustable collimator 130. FIG. 2B shows a perspective view of adjustable collimator 130. FIG. 2C shows a sectional view of adjustable collimator 130.

Referring first to FIG. 2A which shows an exploded view of the components of adjustable collimator 130. Collimator 130 includes a generally tubular housing 200 having a central bore 206 aligned with a longitudinal axis 209. At the distal end of housing 200 is a flange 208 adapted for mounting to a lamphouse mount of a microscope (not shown). An achromat lens 250 (housing lens) is secured in the distal end of central bore 206 by a circular retainer 252. Circular retainer 252 is secured with one or more machine screws 254 to housing 200.

Sleeve 210 is designed to be received in central bore 206 such that sleeve 210 can slide within central bore 206 of housing 200. Sleeve 210 also has a central bore 216. An achromat lens 220 (sleeve lens) is received in the distal end of central bore 216 and held in place by circular retainer 222. Sleeve 210 includes a first threaded bore 213 and a second threaded bore 214.

During assembly, after installation of lenses 250, 220, sleeve 210 is positioned within central bore 206 of housing 200. A first knurled knob 230 is installed through slot 203 of housing 200 into first threaded bore 213. First knurled knob 230 may comprise a machine screw with a suitable head for manual tightening and loosening. First knurled knob 230 is designed to selectively engage housing 200 such that the relative position of sleeve 210 and housing 200 can be adjusted and fixed.

A second knurled knob 240 is installed through slot 204 of housing 200 into second threaded bore 214. Second knurled knob 240 may comprise a machine screw with a suitable head for manual tightening and loosening. Second knurled knob 240 is designed to engage a light guide within sleeve 210 such the position of the light guide relative to sleeve 210 can be adjusted and fixed. This allows adjustment of the position of the output aperture of a light guide (not shown) relative to sleeve 210.

FIG. 2B shows a perspective view of adjustable collimator 130 after assembly. Sleeve 210 is received inside housing 200. As shown in FIG. 2B the proximal end of central bore 216 of sleeve 210 is exposed for insertion of a light guide (not shown). When a light guide is inserted into central bore 216, second knurled knob 240 can be turned to secure the light guide at a desired position. Note also, that sleeve 210 can slide within housing 200 as shown by arrows 260. When sleeve 210 is at the desired position, first knurled knob 230 can be turned to engage housing 200 and fix the relative position of housing 200 and sleeve 210.

FIG. 2C shows a sectional view of adjustable collimator 130 after assembly and insertion of a light guide 110 and securing of the flange 208 of housing 200 to a lamphousing mount 122 of a microscope 120 using one or more set screws. As shown in FIG. 2C, a light guide 110 is received in the proximal end of central bore 216 of sleeve 210. Light guide 110 can slide, as shown by arrow 262, into central bore 216, second knurled knob 240 can be turned to secure the light guide 110 at a desired position. Thus, the user can adjust the relative distance D2 between the output aperture 264 of the light guide 110 and the achromat lens 220.

Note also, that sleeve 210 can slide within housing 200 as shown by arrow 260. When sleeve 210 is at the desired position, first knurled knob 230 can be turned to engage housing 200 and fix the relative position of housing 200 and sleeve 210. Thus, the user can adjust the distance D1 between achromat lens 220 (sleeve lens) and achromat lens 250 (housing lens).

The user can thus adjust a first distance D1 between achromat lens 220 and achromat lens 250 and also adjust a second distance D2 between the outlet aperture 264 of the light guide 110 and achromat lens 220. The dual-adjustment design of adjustable collimator 130 is designed to afford the user the possibility to control not only the focal distance but the size of the illumination area as well. The collimator can be used a variety of microscope models with different optical trains.

The user may choose to use adjustable collimator 130 to optimize the illumination spot size in one of two ways: First, the area to fill the back aperture of the microscope objective may be maximized to ensure complete and even illumination of the entire optical field. Alternatively, the user may optimize the intensity that reaches the detector or camera chip, by adjusting the spot size to something significantly less than the objective's back aperture. In so doing, the power will be concentrated within a smaller area that boosts intensity at the detector far exceeding anything a traditional metal halide lamp and collimator can do. Using a smaller spot size ensures the most intensity reaches the detector.

Adjusting the spacing D1 between achromat lens 220 and achromat lens 250 can be used to optimize the size of the illuminated spot. In order to adjust the size of the illuminated spot, the user loosens first knurled knob 230. The user can then adjust the lens spacing D1 by sliding first knurled knob 230 along slot 203 and thereby adjust the size of the illuminated spot.

Adjusting the relative position of the light guide 110 and sleeve 210 can be used to generate a crisp, focused field of view. In order to generate a crisp, focused field of view, the user loosens second knurled knob 240. The user can then slide light guide 110 within sleeve 210, and thereby adjust the distance D2 between outlet aperture 264 and achromat lens 220. In order to focus the beam on the back aperture of the microscope objective, the user alternately adjusts the lens spacing D1 and the light guide spacing D2. When the image is focused the user tightens both knurled knobs 230 and 240.

FIGS. 3A-3E shows aspects of the solid state illumination engine 100 of FIG. 1. Solid state illumination engine 100 is suitable for use as a replacement for conventional arc light, Metal Halide and Xenon white-light sources for applications in microscopy, fluorescence microscopy, and endoscopy. The solid state illumination engine 100 includes multiple solid state light sources operating simultaneously to generate white light output or operating separately to provided light of a desired spectral distribution. When generating white light, the solid state illumination engine 100 generates white light which is continuous in the visible spectrum from 380 nm to 650 nm, has a high color rendering index, and is suitable for microscopic and endoscopic imaging. The solid state illumination engine 100 includes two solid state laser light sources which provide coherent light having selected wavelengths. Features of the solid state illumination engine 100 include: powerful white light for high-definition (HD) visible illumination and imaging; controllable color spectrum for high contrast imaging matched to color cameras; narrowband light for indocyanin green (ICG) excitation, endogenous fluorescence, other imaging agents; simultaneous illumination of white light and fluorescence images; spectral stability (<1% drift, usage dependent) & power stability (5 kHz with turn on/off ~10 µs); illumination uniformity; microsecond switching with no filters or shutters (≥5 kHz modulation, ≤6 µs rise time, ≤20 µs fall time); minimal heat generation; computer control; long life >10,000 hours with no consumable parts; short warm up time (1-10 minutes); and a compact size (9×18×23 cm) for off-the-shelf and custom OEM configurations. Options include a customizable Wavelength range tailorable from visible to NIR; customizable maximum and minimum light optical power per application; customizable optical interface adapted e.g. for optical fibers, fiber bundles, liquid light guides; customizable complete computer control interface via e.g. RS-232, TTL and USB; and a dosimeter for realtime instantaneous power monitoring.

The solid state illumination engine 100 is designed to interface to the array of bioanalytical tools with the expectation that the end user can take for granted the high quality of the illumination. For example, Kohler illumination in transmitted light microscopy requires that the light be focused and collimated down the entire optical path of the microscope to provide optimal specimen illumination. Even light intensity across a fairly large plane is a critical requirement. For stereomicroscopy, lighting is achieved with ring-lights at the objective and fiber optic lights pointed at the specimen from the side. In both cases, the light engine must efficiently couple to a fiber optic cable and thence to the particular bioanalytical tool.

In a preferred embodiment the total optical output power is approximately 2.5 W. Advantageously, the spectral power of the solid state illumination engine 100 is equal to or greater than the spectral power of a 120 W metal halide lamp or 150 W Xenon lamp across substantially the entire visible spectrum from 380 nm to 650 nm. If needed, the user can utilize a broad range of commercially available filters. This provides the most flexibility to the user in utilizing the light output. The solid state illumination engine 100 includes an adapter for coupling the output of solid state illumination engine 100 into a light guide, for example a liquid light guide or fiber optic light guide for transmission to an endoscope or microscope.

The cooling requirements for a solid state illumination system are substantially different than that for an incandescent light source. Incandescent lights typically release 90% or so of the heat they generate to their environment through radiation in the infrared and less than 10% through conduction. In comparison, LEDs typically release 90% or so of the heat they generate to their environment through conduction and less than 10% through conduction. Thermal dissipation is a key factor that limits the power output of an LED light source. Even though LEDs bulbs are considerably more efficient at converting electrical energy into light than incandescent light sources, but the LED components and the driver electronics can still create a considerable amount of heat. If this heat is not dissipated properly, the LED's quality of light, emission spectra, and life expectancy decrease dramatically. Thus, it is important in a solid state illumination system relying on LEDs to provide a solution for conductive cooling of the LEDs.

Figure 3C:
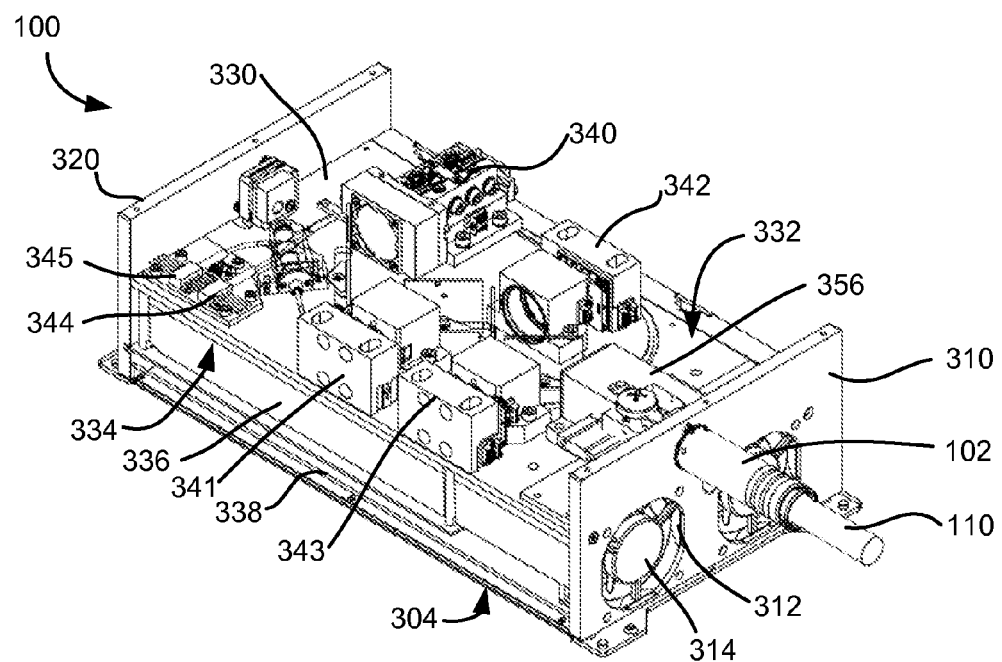
FIG. 3C shows an internal perspective view of the solid state illumination engine of FIGS. 3A and 3B.
Figure 3D:
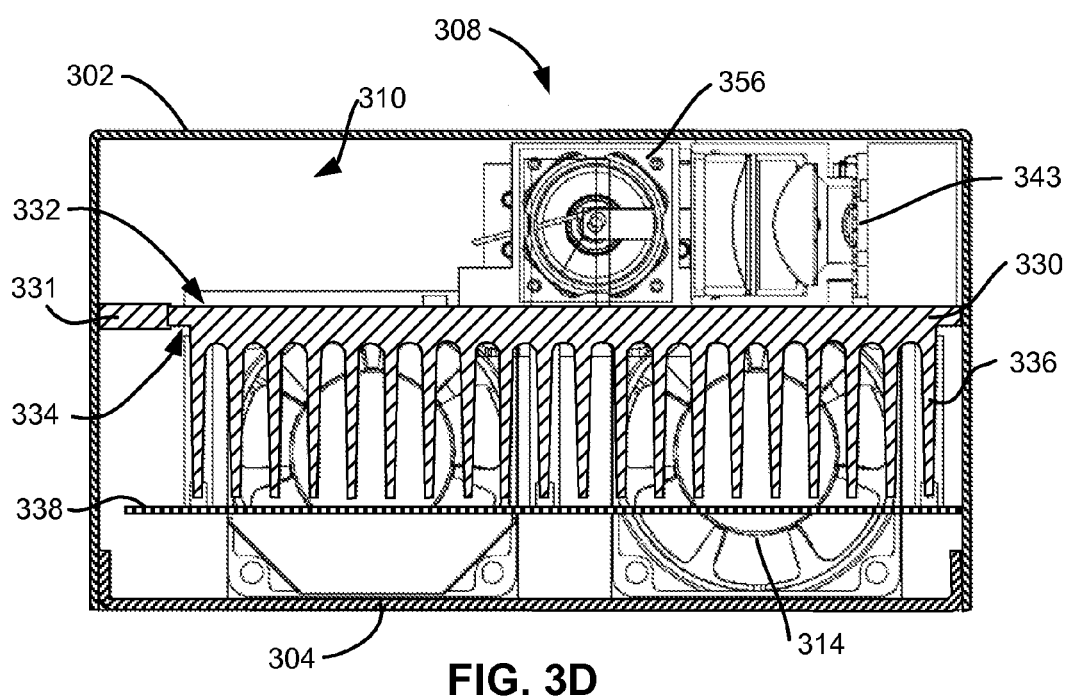
FIG. 3D shows a sectional view of the solid state illumination engine of FIGS. 3A and 3B.
Figure 3E:
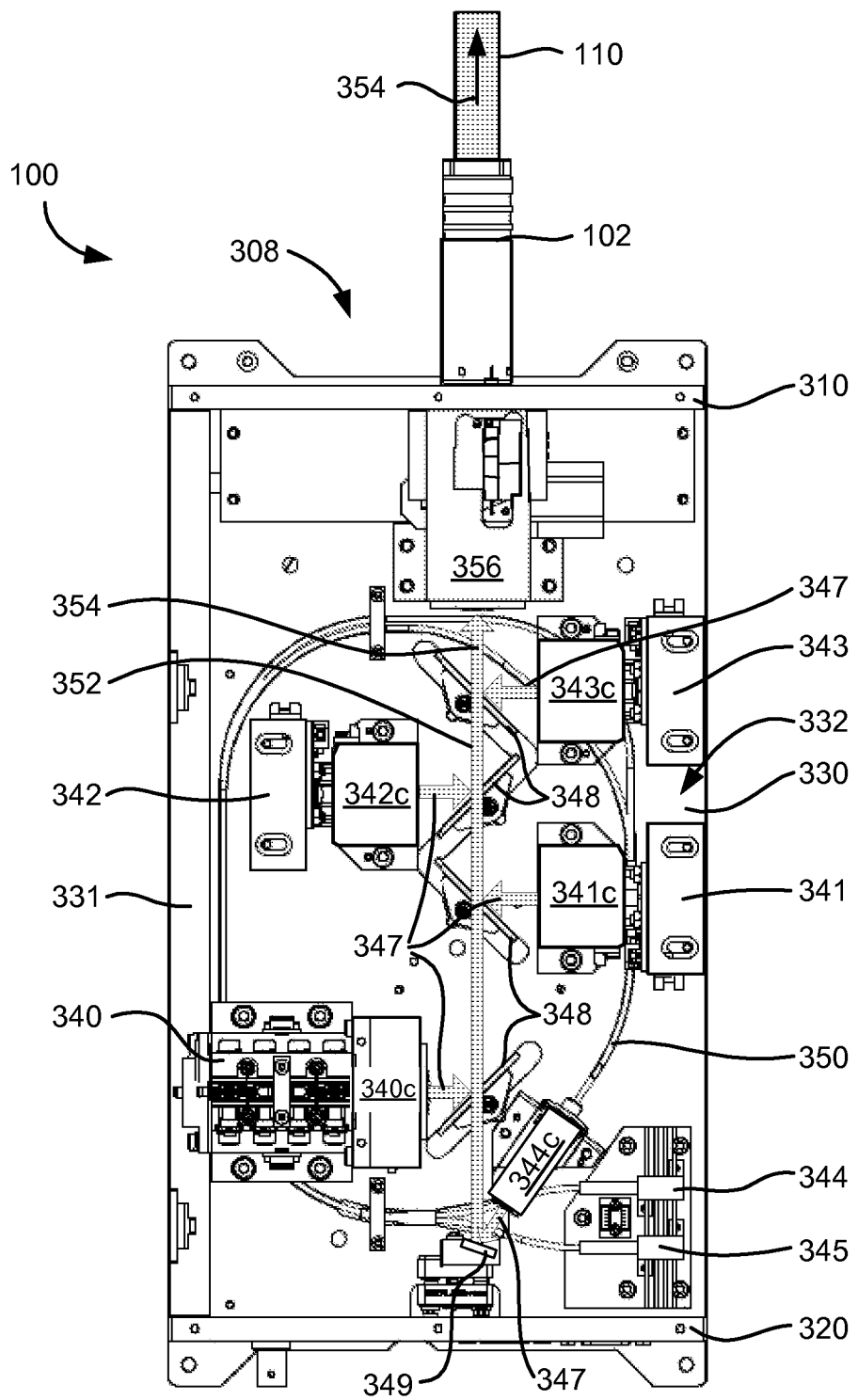
FIG. 3E shows an internal plane view of the solid state illumination engine of FIGS. 3A and 3B.

FIGS. 3A and 3B show exterior perspective views of the solid state illumination engine 100. FIG. 3C shows an internal perspective view of the solid state illumination engine 100. FIG. 3D shows a sectional view of the solid state illumination engine 100. FIG. 3E shows a top view of the optical components of the solid state illumination engine 100.

Referring first to FIGS. 3A and 3B which show exterior perspective views of solid state illumination engine 100. Solid state illumination engine 100 is enclosed by a 3-sided cover 302, front plate 310, back plate 320 and base plate 304. 3-sided cover 302, front plate 310, back plate 320 and base plate 304 together comprise a housing 308 which protects the solid state illumination engine 100 and substantially prevents the entry/exit of light, and air except as provided. Front plate 310 includes two apertures 312 through which two fans 314 draw air for cooling the solid state illumination engine 100. Front plate 310 also supports an adapter 102 which accepts a light guide 110 which may be a liquid light guide or fiber optic light guide. Back plate 320 includes two apertures 322 through which the cooling air exits the solid state illumination engine 100. Back plate 320 also bears computer control ports 324, shutter control port 326 and power port 328 and switch 329.

FIG. 3C shows an internal perspective view of the solid state illumination engine 100 with the 3-sided cover 302 removed. As shown in FIG. 3C, the interior of solid state illumination engine 100 is divided by a platform 330. The top surface 332 of platform 330 is substantially flat and supports the solid state light sources and associated optics. The bottom surface 334 of platform 330 bears a plurality of fins 336 which provided a large surface area for the cooling of platform 330. The fins are arranged parallel to the axis of the air flow from the front plate 310 to the back plate 320. Platform 330, maintains the cooling air flow from fans 314 in the lower portion of housing 308 between base plate 304 and platform 330. This prevents cooling air flow from fans 314 around the solid state light sources and associated optics reducing the possibility of contamination of the optical components. Control board 338 sits between platform 330 and base plate 304 such that it also receives cooling air flow from fans 314. Control board 338 includes the circuitry for driving the solid state light sources, shutter and sensors of solid state illumination engine 100.

FIG. 3D shows a sectional view through solid state illumination engine 100 looking towards front plate 310 and fans 314. As shown in FIG. 3D, fans 314 direct cooling air only through the lower portion of housing 308 between the lower surface 334 of platform 330 and base plate 304. The cooling air is directed past fins 336 on the lower surface 334 of platform 330. The cooling air is directed past both sides of control board 338. Cooling air is not circulated above platform 330 among the solid state light sources and associated optics. Note that in the embodiment shown, platform 330 includes a platform extension 331 which extends platform 330 the full width of housing 308. In alternative embodiments platform 330 is formed in one piece and extends the full width of housing 308.

FIG. 3E shows a top of the solid state illumination engine 100 with the 3-sided cover 302 removed. FIG. 3E shows the layout of the solid state light sources and associated optics on the top surface 332 of platform 330. In the embodiments of solid state illumination engine 100, the solid state light sources include a light pipe engine 340, three LED light sources 341, 342, 343, and two solid state laser light sources 344, 345. The light pipe engine 340 and three LED light sources 341, 342, and 343 emit non-coherent light of different colors. The LED light sources 344, 345 emit coherent light in different narrow band wavelengths. Each of the light sources includes a collimator 340c, 341c, 342c, 343c which forms the light output from the source into a collimated beam 347. The solid state laser light sources 344, 345 are coupled to a single collimator 344c by an optical fiber 350. Each of the light sources is aligned with a dichroic mirror 348 at which the collimated light beam 347 is directed. The dichroic mirrors 348 are aligned so as to combine the collimated beams 347 onto a single optical axis 352 generating a combined coaxial beam 354 aligned with output optics 356. Output optics 356 focus the combined beam 354 into light guide 110 positioned within adapter 102. Light guide 110 transmits the combined beam 354 to a microscope via adjustable collimator 130 (see light 150 of FIG. 1).

Light pipe engine 340, three LED light sources 341, 342, 343, and two solid state laser light sources 344, 345 are selected to provide different color components of the spectral content of the light output. In a preferred embodiment, the three LED light sources 341, 342, 343 each produce a different color component of the continuous light output. The output wavelengths of the sources overlap and combine to some extent contributing the overall spectral output of the solid state illumination engine 100. In an alternative embodiment, one or more of light pipe engine 340, three LED light sources 341, 342, 343 is provided with a manual or electromechanical filter slider (see, e.g. 512 of FIG. 5) which filters and thereby adjusts the spectral content of the light from the light source prior to combination with the light from the other sources. The LED light sources and the light pipe engine are controlled by the controller board 338 either together or individually to control the spectral content of the output beam. In embodiments the light pipe engine 340 and three LED light sources 341, 342, 343 produce spectral components centered on colors violet 395 nm, blue 425-460 nm, cyan 460-500 nm, teal 515 nm, green 500-615 nm, and red/orange 615-685 nm. All of light pipe engine 340 and three LED light sources 341, 342, 343 can be turned on at the same time such that the different colors are combined to create a substantially continuous white light having a high color rendering index (CRI). In alternative embodiments, a second light pipe engine can be used in place of or in addition to the three LED light sources 341, 342, 343. In a preferred embodiment light pipe engine 340 is used to generate green (green and yellow) light spanning 500-600 nm.

As previously described the cooling air from fans 314 is not circulated in the upper portion of housing 308. However, the solid state light sources including light pipe engine 340, three LED light sources 341, 342, 343, and two solid state laser light sources 344, 345 generate a heat during operation. This heat must be removed such that the temperature of the solid state light sources is maintained at a desired level. In prior devices, the individual solid state light sources were provided with individual finned heat sinks and air was passed over the heat sinks using a common or individual fan to remove heat—however, this cooling system allowed for the entry of dust and/or other contaminants into the light sources and onto the optical components. The dust and/or other contaminants could cause a number of problems including: reduction in optical efficiency, scattering of light within housing 308, burning, and burning odor.

In the solid state illumination engine 100 shown in FIGS. 3A-3E, each of the solid state light sources including light pipe engine 340, three LED light sources 341, 342, 343, and two solid state laser light sources 344, 345 is in thermal contact with platform 330. The thermal contact is direct metal to metal contact or may be mediated by a thermal paste between the solid state light source and the platform 330. Platform 330 is made from a conductive metal/metal alloy such that head from the solid state light sources is rapidly conducted away towards fins 336 which are provided with cooling air by fans 314. Thus platform 330 serves both as an optical table for mounting and aligning the solid state light sources, mirrors and output optics as well as a common heat sinks for the solid state light sources including light pipe engine 340, three LED light sources 341, 342, 343, and two solid state laser light sources 344, 345. The solid state light sources are suitably designed to efficiently transmit heat from their components to the platform 330 as described with respect to FIGS. 4A-7D below. Light pipe engine 340, three LED light sources 341, 342, 343, and two solid state laser light sources 344, 345 are arranged on the platform based upon their heat output, for example, in an embodiment, light pipe engine 340 puts out 100 Watts of heat whereas LED light sources 341, 342, 343 put out 25 Watts of heat each. Thus, the thermal output of the light sources is considered when arranging the light sources to ensure that each is adequately cooled by the cooling airflow on the finned side of platform 330.

Figure 3F:
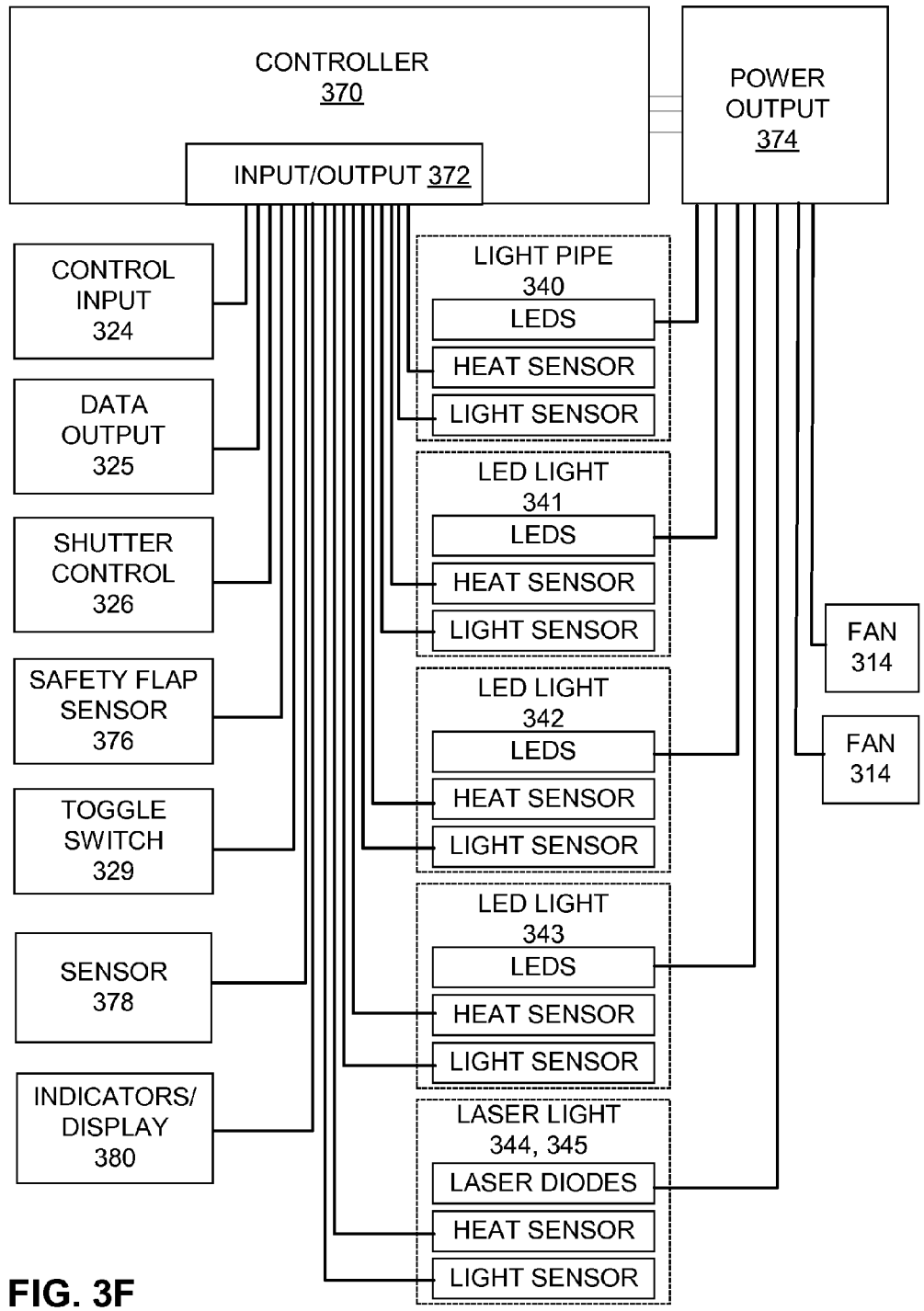
FIG. 3F illustrates a block diagram of a control system of the solid state illumination engine of FIGS. 3A to 3F.

FIG. 3F illustrates a control system of the solid state illumination engine 100 of FIGS. 3A and 3B. As shown in FIG. 3F, control board 338 see FIGS. 3C, 3D includes a controller 370. Controller 370 includes an input/output system 372 for receiving data from the various sensors, input port and input devices and sending data to the data output port and or any indicator/display devices. Controller 370 is coupled to power output system 374 which provides power to the electrical, optical and mechanical components of solid state illumination engine 100. Because of the solid state nature and independently operable designs of the light sources, coupled to fast (approximately 10 ns) decay times of typical materials employed, the solid state illumination engine 100 does not require a mechanical shutter and is capable of rise times of less than 20 μs and fall times of less than 2 μs under the control of controller 370 which is compatible with triggering by TTL, RS232 and USB and intensity control by RS232, USB or manually). Each light source is operated simultaneously to generate a continuous white light output. Alternatively, each source can be switched independently to generate an output of the desired spectral power distribution and/or color.

In the control system embodiment shown in FIG. 3F, controller 370 is coupled by input/output system 372 to control input port 324, data output port 325, shutter control port 326, safety flap sensor 376, toggle switch 329, additional sensor(s) 378, display/indicators 380, as well as the heat and light sensors of each light source, including light pipe engine 340, three LED light sources 341, 342, 343, and two solid state laser light sources 344, 345. Additional sensors 378, display/indicators 380 and inputs/switches and outputs may be added to solid state illumination engine 100 as necessary to support desired functionality for the system, however, typically a computer connected to control input port 324 and data output port 325 is used to control and monitor solid state illumination engine 100 and provides control and data display flexibility. Input and output can be provided, for example via TTL, RS232 and/or USB. Controller 370 is coupled to power output system 374 which provides electrical power to drive the LEDs and laser diodes of light pipe engine 340, three LED light sources 341, 342, 343, and two solid state laser light sources 344, 345. Power output system 374 is also coupled to fans 314 such that controller 370 can control the speed of fans 314 in order to control the temperature of solid state illumination engine 100. The fan speed may be adjusted in response to temperature readings from the heat sensors of the various components of solid state illumination engine 100. Fans 314 are, in some embodiments driven at different speeds to account for the different cooling requirements of the components cooled by air from the particular fan.

The solid state illumination engine 100 generates powerful, white and/or multi-color, stable, durable light. The illumination can be tuned to match any color temperature of interest. This is particularly important for minimally invasive surgery where RGCB components can be balanced for maximum signal/noise and contrast. Simultaneously, fluorophore excitation may be superimposed on the general field producing superior image quality as well as optical selectivity. In a typical embodiment, light pipe engine 340 produces 3.0 Watts of green light output (wavelength 500-615 nm); and LED light sources 341, 342, 343 produce 1.8 Watts of blue light output (wavelength 425-460 nm), 0.9 Watts of cyan light output (460-500 nm), and 1.8 Watts of red light output 615-685. All of light pipe engine 340 and three LED light sources 341, 342, 343 can be turned on at the same time such that the different colors are combined to create a substantially continuous white light having a high color rendering index (CRI). Solid state laser light sources 344, 345 can produce near infrared light for fluorescence excitation for example 6.0 W of narrowband red at 385-880 nm.

Figure 3G:
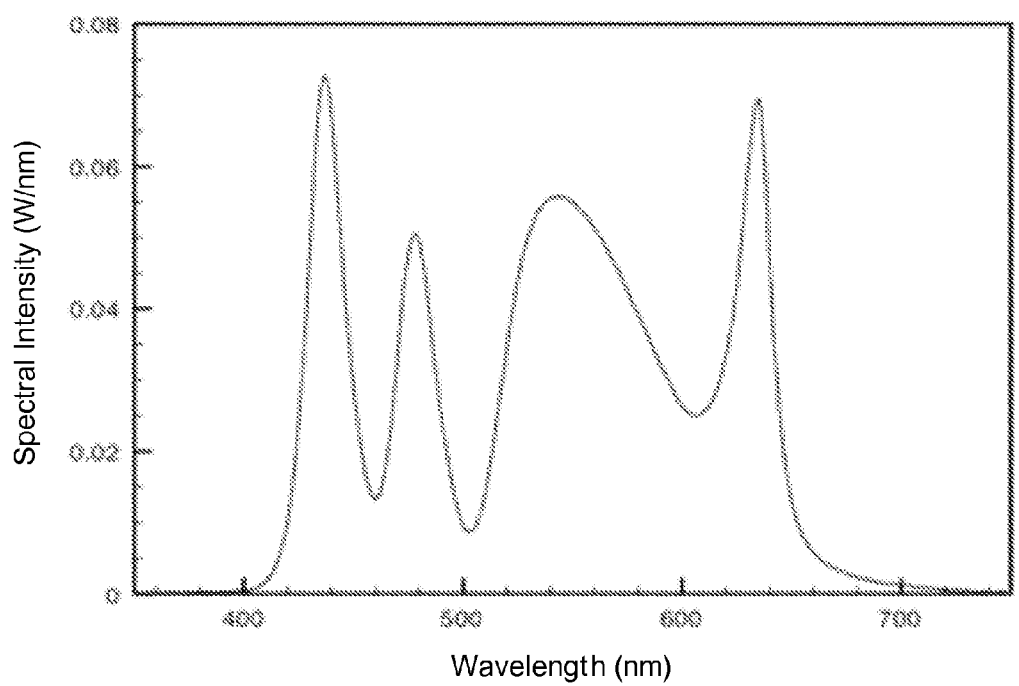
FIG. 3G illustrates the output spectra of one embodiment of the solid state illumination engine of FIGS. 3A to 3E.

FIG. 3G illustrates the output spectra of one embodiment of the solid state illumination engine 100 of FIGS. 1 and 3A and 3B. As illustrated by FIG. 3G the solid state illumination engine 100 can produce powerful white light with any color temperature (red/green/cyan/blue, RGCB) alongside narrowband excitation for targeting fluorescence. The illumination engine 100 is powerful enough to yield high contrast, real-time imaging as well as to maximize fluorescence signals. The illumination system provides spectral, temporal and spatial control of light for surgical and non-surgical procedures. The stable, robust lighting enables long term monitoring and quantitation.

Figure 4A:
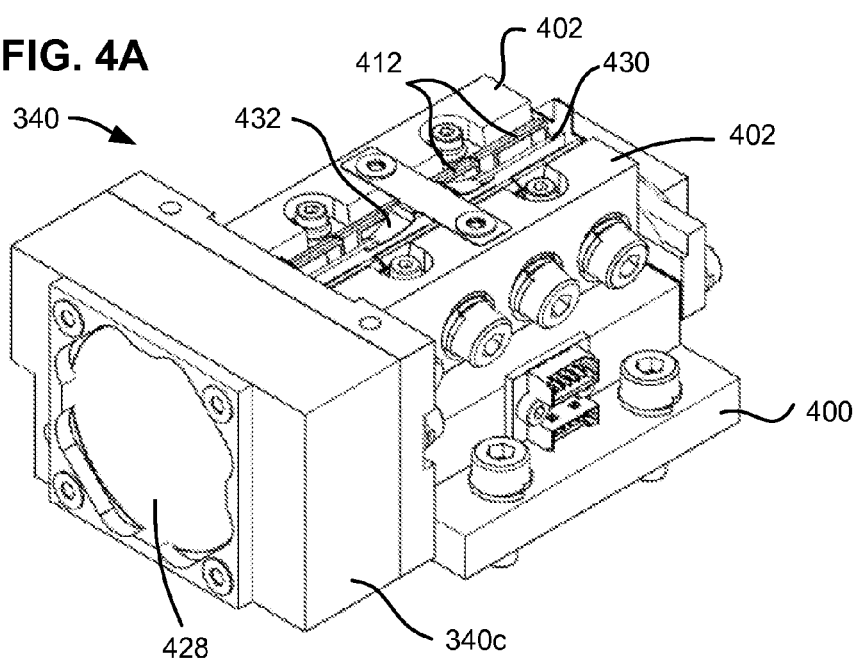
FIG. 4A shows a perspective view of a light pipe engine subsystem of the solid state illumination engine of FIGS. 1 and 3A to 3E according to an embodiment of the present invention.
Figure 4B:
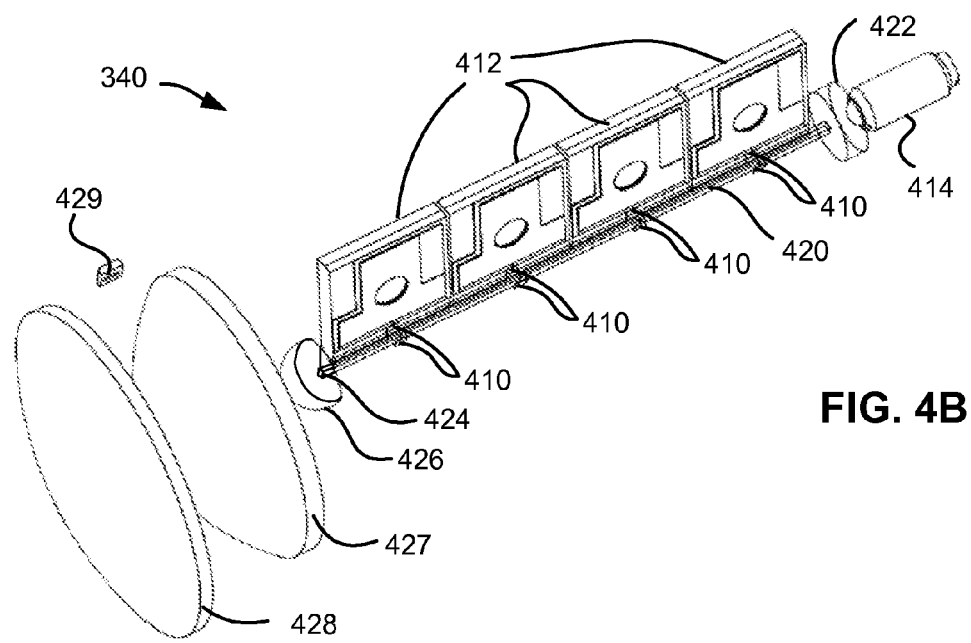
FIG. 4B shows a perspective view of the optical components of the light pipe engine of FIG. 4A.

FIGS. 4A-4F show views of light pipe engine 340 of FIG. 3C. FIG. 4A shows a perspective view of light pipe engine 340. FIG. 4B shows a partial perspective view of light pipe engine 340 illustrating the optical components of light pipe engine 340. FIG. 4C shows a partial perspective view of light pipe engine 340 illustrating the arrangement of heat generating components of light pipe engine 340. FIG. 4D shows an end view of components of light pipe engine 340. FIGS. 4E and 4F are sectional views of light pipe engine 340.

Referring first to FIG. 4A which shows a perspective view of light pipe engine 340. Light pipe engine 340 includes base 400 and two slant blocks 402 mounted to base 400. Slant blocks 402 and base 400 are made of a conductive metal or metal alloy. Collimator 340c is mounted to base 400.

FIG. 4B shows a partial perspective view of light pipe engine 340 illustrating the optical components of light pipe engine 340. As shown in FIG. 4B, eight (8) LED dies 410 are arranged in two linear arrays of four (4) along two sides of a luminescent rod 420. Each LED die 410 includes one or more light-emitting diodes. Each LED die 410 is supported by an LED board 412 (only four are shown). At the rear end of luminescent rod 420 and in contact with the end of luminescent rod 420 is a first surface mirror 422. The mirror reflects light toward exit aperture 424 at the front end of luminescent rod 420. A truncated sphere lens 426 is mounted to luminescent rod 420 over exit aperture 424 using optical cement. The mirror 422 is held in contact with luminescent rod 420 by a spring plunger 414. The spring plunger 414 holds mirror 422 against luminescent rod 420 and luminescent rod 420 against truncated sphere lens 426 while accommodating thermal expansion of luminescent rod 420 during operation. Light emitted by luminescent rod 420 is directed by truncated sphere lens 426 to two plano-convex lenses 427, 428 of collimator 340c which operate to collimate the light into a collimated beam. A light sensor 429 is positioned adjacent the periphery of plano-convex lens 427 to monitor light output by luminescent rod 420.

In a preferred embodiment light pipe engine 340 is used to generate green (green and yellow) light spanning 500-600 nm. LED lights that directly emit green light at high power are notoriously difficult to create—the so-called green gap. Thus light pipe engine 340 utilizes high power blue LED light sources to excite a luminescent rod 420 which emits green light spanning 500-600 nm. In a preferred embodiment light pipe engine 340 utilizes two linear arrays of LED dies including forty light emitting diodes to excite emission of green light from the luminescent rod 420. Additional light pipe engines are also described in the Related Applications listed above and incorporated herein by reference. The luminescent rod 420 of the light pipe engine 340 requires cooling during operation and can be convectively cooled as previously described or conductively cooled by being clamped into contact with a metal pedestal heat sink (for example a copper/aluminum/steel heat sink). For example, luminescent rod 420 can reach 200° C. during operation as a result of heating by the LEDs and also the stokes energy released during the absorption of blue light and emission of green light. Light pipe engine 340 operating to generate green light allows the solid state illumination engine 100 to produce an output in the green and amber bands that is the same or greater than commonly used arc lamps (see, e.g. FIG. 6C). Thus, no compromise in output power, even for the 546 nm band of the arc lamp, is incurred as a consequence of using solid state illumination engine 100 as a replacement for an arc lamp. For example, in an embodiment the optical power of light pipe engine is 3.0 Watts over a range of wavelengths between 500 and 615 nm.

FIG. 4C shows a partial perspective view of light pipe engine 340 illustrating the arrangement of heat generating components of light pipe engine 340. As shown in FIG. 4C, luminescent rod 420 is positioned on a spine 401 which protrudes from base 400. In a preferred embodiment, base 400 including spine 401 are made of copper. Spine 401 is roughened where it contacts luminescent rod 420. Spine 401 extends the full length of base 400 and is slightly narrower in width than luminescent rod 420. Luminescent rod 420 is held in contact with spine 401 by ceramic fin 430. Down force is applied to ceramic fin 430 by leaf spring 432 which is mounted between the slant blocks 402 (only one slant block is shown). The down force serves to secure luminescent rod 420 in contact with spine 401. Ceramic fin 430 and luminescent rod 420 are aligned with each other and with spine 401 by slots 436 in end plates 434 mounted to base 400. Slots 436 are preferably laser cut in steel.

As shown in FIG. 4C, LED dies 410 are mounted to LED board 412 (four shown) are secured to slant blocks 402 (one shown) using bolts. In a preferred embodiment each LED board 412 includes 10 light-emitting diodes. Heat generated in LED dies 410 is transmitted through LED boards 412 to slant blocks 402 and thence to base 400. Heat absorbed and/or generated in luminescent rod 420 is transmitted directly to base 400 through spine 401. Thermal sensors 438 are provided on base 400, luminescent rod 420 and LED boards 412 to monitor the temperature of the components during operation. Thus heat generated in the electrical and optical components of light pipe engine 340 is rapidly transmitted to base 400. Base 400 is secured in thermal contact with platform 330 such that heat is rapidly transferred to platform 330 and then dissipated from fins 336 to the cooling air provided by fans 314 (see FIGS. 3C and 3D). In a preferred embodiment platform 330 is made in one piece from aluminum.

FIG. 4D shows an end view of light pipe engine 340 illustrating alignment of ceramic fin 430 and luminescent rod 420 with spine 401 of base 100 by slot 436 in end plate 434. Luminescent rod 420 is held in contact with spine 401 by ceramic fin 430. Down force is applied to ceramic fin 430 by leaf spring 432 which is mounted between the slant blocks 402. The down force serves to secure luminescent rod 420 in contact with spine 401. Ceramic fin 430 and luminescent rod 420 are aligned with each other and with spine 401 by slots 436 in end plates 434 mounted to base 400. Slots 436 are preferably laser cut in steel.

FIG. 4E shows a sectional view of light pipe engine 340 perpendicular to the axis of luminescent rod 420. FIG. 4F shows a sectional view of light pipe engine 340 parallel to the axis of luminescent rod 420. FIGS. 4E and 4F illustrate the cooperation between the components of light pipe engine 340 to maintain luminescent rod 420 and the LED boards 412 in close thermal contact with slant blocks 402 and base 400. FIG. 4F also illustrates the optical path including mirror 422, luminescent rod 420, truncated sphere lens 426 and plano-convex lenses 427 and 428.

Figure 5A:
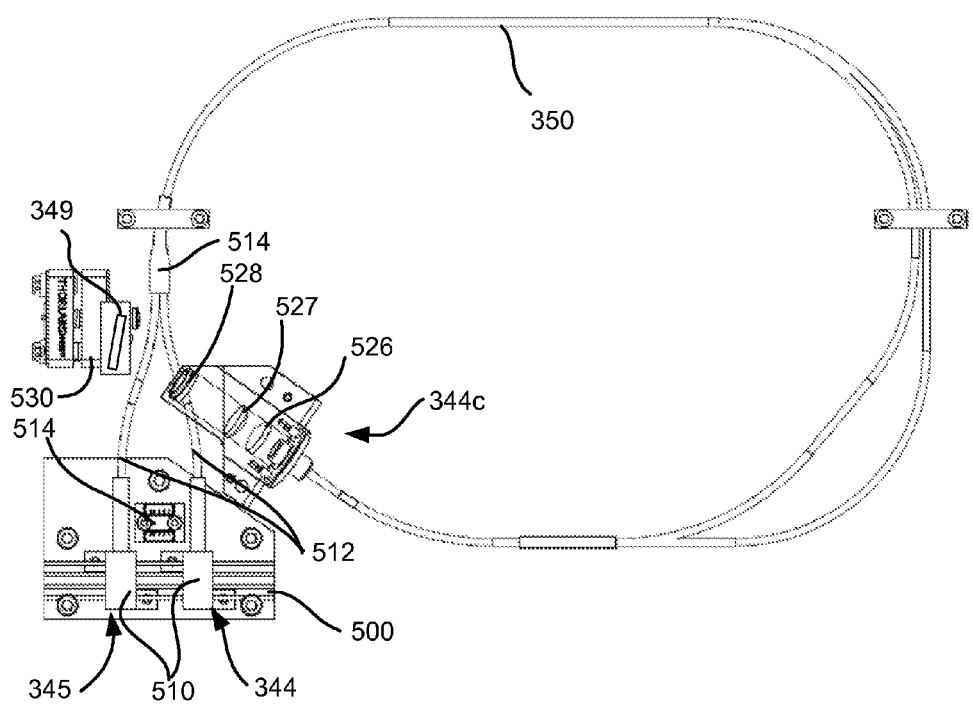
FIG. 5A shows a top view of a laser light subsystem of the solid state illumination engine of FIGS. 1 and 3A to 3E according to an embodiment of the present invention.
Figure 5B:
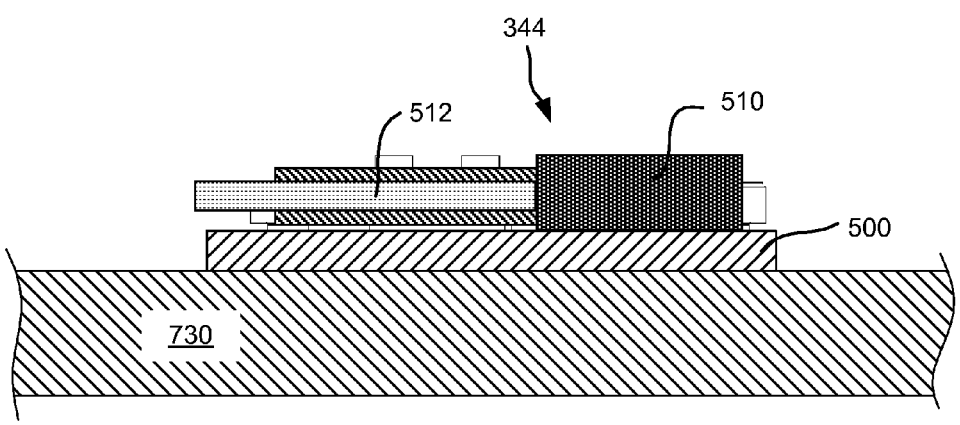
FIG. 5B shows a sectional view of a laser light subsystem of FIG. 5A.

FIGS. 5A and 5B illustrate the two solid state laser light sources 344, 345 and related collimator 344c and optical fiber 350. As shown in FIG. 5A, laser light sources 344, 345 each include a laser-diode module 510, coupled to an optical fiber 512. The laser-diode modules emit coherent light of a selected narrow wavelength. For example laser-diode modules in an embodiment emit coherent near-IR light. A connector 514 links the two optical fibers 512 into an optical fiber 350 which connects to collimator 344c. Optical fiber 350 serves to mix and homogenize the coherent light from laser light sources 344, 345 reducing artifacts such as speckling and interference fringing in the light. The combined coherent light exits optical fiber 350 into collimator 344c which includes three plano-convex lenses 526, 527 and 528. Collimator 344c also serves to expand the laser light from laser light sources 344, 345. The first plano-convex lens 526 is arranged to expand the light beam exiting the optical fiber 350. The second and third plano-convex lenses 527, 528 collimate the expanded beam and direct the expanded beam of coherent light at first-surface mirror 349. First surface mirror 349 is aligned such that the expanded beam of coherent light is directed along optical axis 352 towards output optics 356 (see FIG. 3E). An adjustable mount 530 facilitates alignment of first-surface mirror 349.

As shown in FIGS. 5A and 5B laser diode modules 510 are mounted to a base 500. Base 500 is a conductive metal base which is itself mounted in thermal contact with platform 330. Heat created by the operation of laser diode modules 510 is transmitted to base 500 and thence to platform 330 where it is dissipated from fins 336 to the cooling air provided by fans 314 (see FIGS. 3C and 3D). One or more thermal sensors are provided to monitor the temperature of laser diode modules 510 and/or base 500 during operation.

Figure 6A:
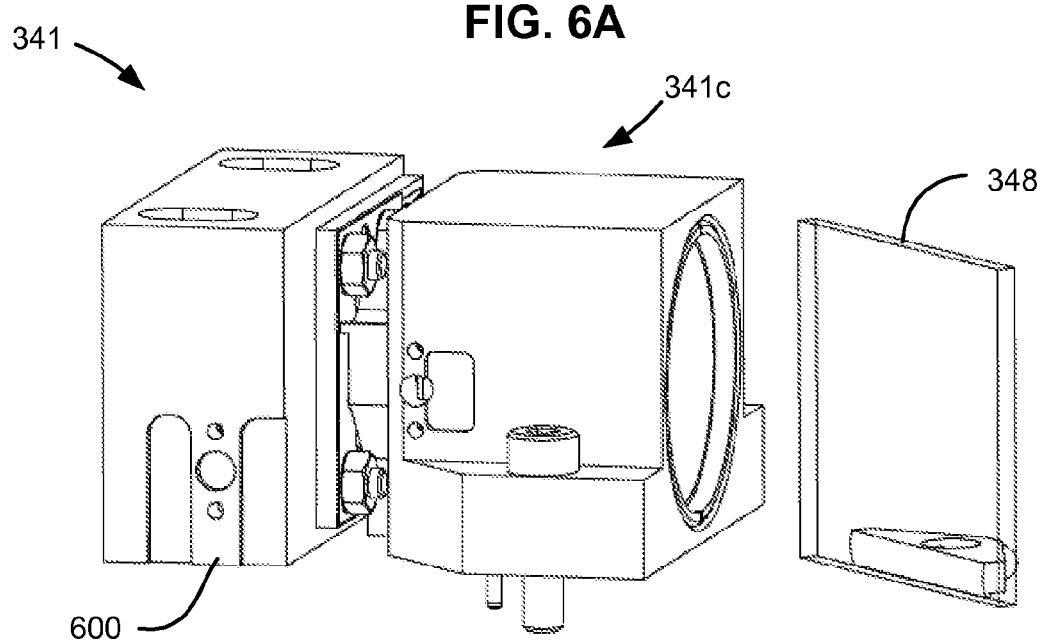
FIG. 6A shows a perspective view of an LED light source subsystem of the solid state illumination engine of FIGS. 1 and 3A to 3E according to an embodiment of the present invention.
Figure 6B:
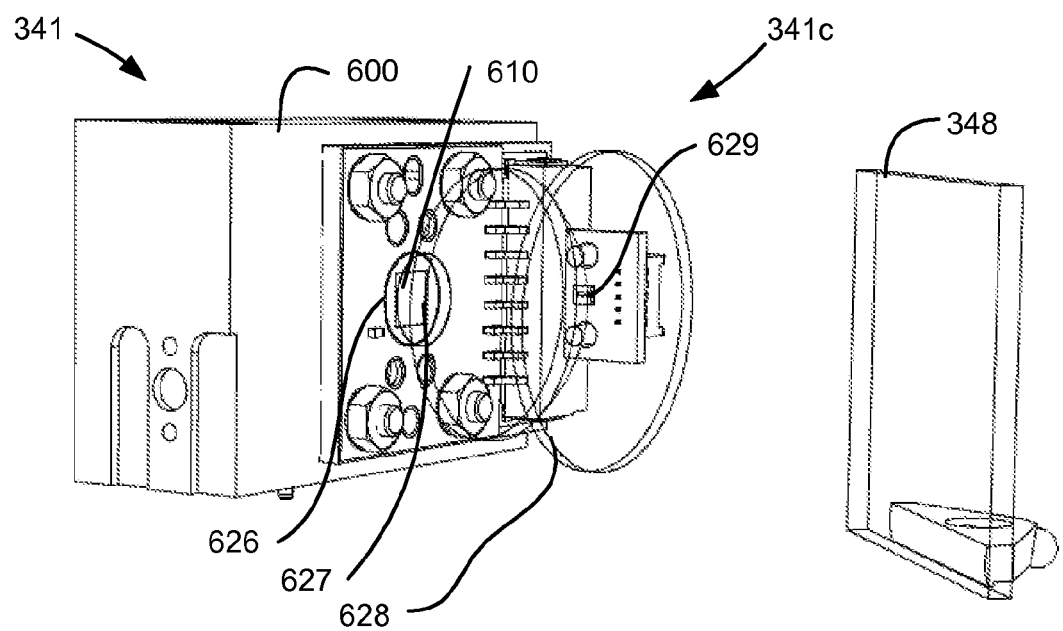
FIG. 6B shows a partial perspective view of the LED light source subsystem of FIG. 6A.
Figure 6C:
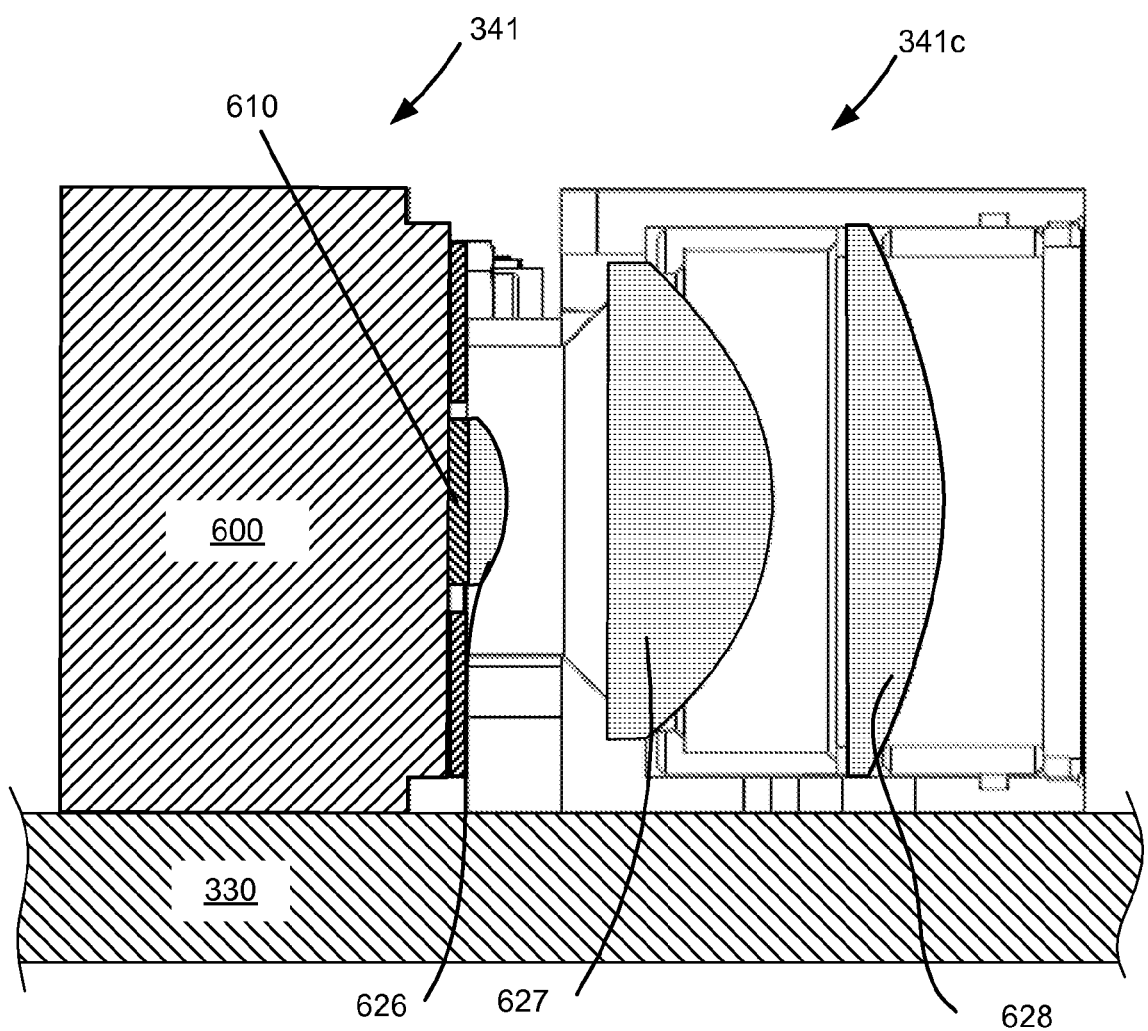
FIG. 6C shows a sectional view of the LED light source subsystem of FIG. 6A.

FIGS. 6A-6C shows views of LED light source 341. LED light sources 342 and 343 have the same design though each of LED light sources 341, 342 and 343 preferably includes LEDs which emit light of different wavelengths than the others of LED light sources 341, 342 and 343. FIG. 6A shows a perspective view of LED light source 341, collimator 341c and associated dichroic mirror 348. As shown in FIG. 6A, Led light source 341 includes a base 600 adapted to be mounted to platform 330 (see FIGS. 3C-7E). Collimator 341c is mounted to base 600.

FIG. 6B shows a partial perspective view of LED light source 341, collimator 341c and associated dichroic mirror 348. As shown in FIG. 6B, LED light source 341 includes an LED die 610. LED die 610 includes a plurality of light-emitting diodes on the same substrate. The substrate is mounted in direct or indirect thermal contact with base 600 such that heat generated by the light-emitting diodes during operation is transmitted to base 600. Base 600 is secured in thermal contact with platform 330 such that heat is rapidly transferred to platform 330 and then dissipated from fins 336 to the cooling air provided by fans 314 (see FIGS. 3C and 3D).

Referring again to FIG. 6B, light emitted from LED die 610 is collected through plano-convex-lens 626 placed over die 610. The light passes through plano-convex lens 626 and is collimated by plano-convex lenses 627, 628 of collimator 341c. A light sensor 629 is placed adjacent plano-convex lens 627 where it receives scattered light in order to monitor the light output of LED die 610. After passing plano-convex lenses 627, 628 the collimated light beam is directed at dichroic mirror 348. Dichroic mirror 348 is aligned such that the collimated beam of light is directed along optical axis 352 towards output optics 356 (see FIG. 3E).

FIG. 6C shows a sectional view of LED light source 341 and collimator 341c. As shown in FIG. 6C, LED light source 341 includes an LED die 610. LED die 610 includes a plurality of light-emitting diodes on the same substrate. The substrate is mounted in direct or indirect thermal contact with base 600 such that heat generated by the light-emitting diodes of LED die 610 during operation is transmitted to base 600. Base 600 is secured in thermal contact with platform 330 such that heat is rapidly transferred to platform 330 and then dissipated from fins 336 to the cooling air provided by fans 314 (not shown, but see FIGS. 3C and 3D).

Referring again to FIG. 6C, light emitted from LED die 610 is collected through plano-convex-lens 626 placed over die 610. The light passes through plano-convex lens 626 and is collimated by plano-convex lenses 627, 628 of collimator 341c.

Figure 7A:
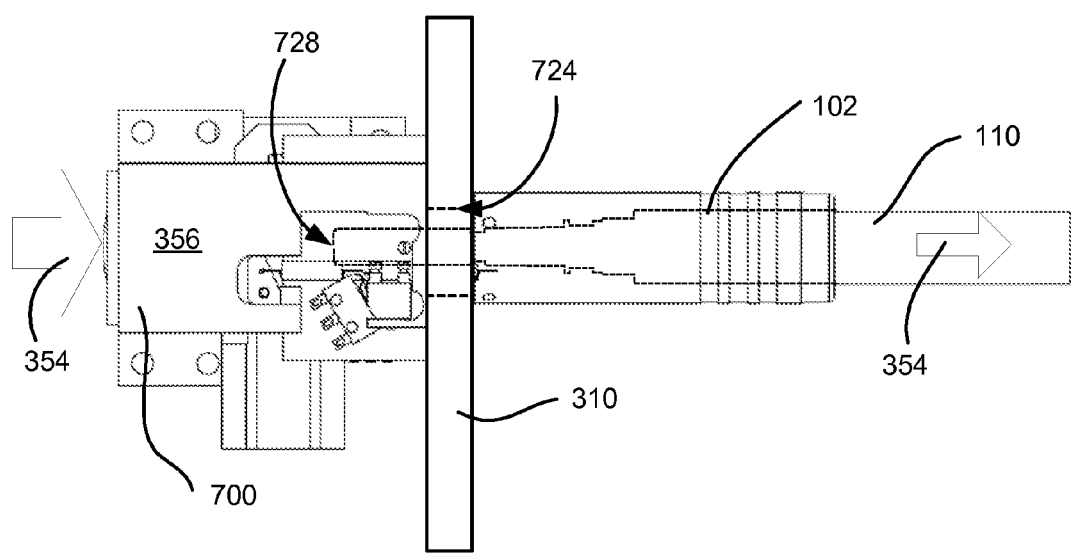
FIG. 7A shows a top view of an output optics subsystem of the solid state illumination engine of FIGS. 1 and 3A to 3E according to an embodiment of the present invention.

FIGS. 7A-7D illustrate output optics 356 of solid state illumination engine 100 (see FIGS. 3C and 3E). As shown in FIG. 7A, output optics 356 receives the collimated combined beam of light 354 from all the light sources of solid state illumination engine 100, focuses the combined beam 354 and directs it into the aperture 728 of light guide 110. An adapter 102 connects light guide 110 to output optics 356 and positions light guide 110 such that the aperture of the light guide is correctly positioned to receive the focused combined beam of light. Output optics 356 are positioned against front plate 310 such that light guide 110 can be connected to output optics 356 through an aperture in front plate 310.

Figure 7B:
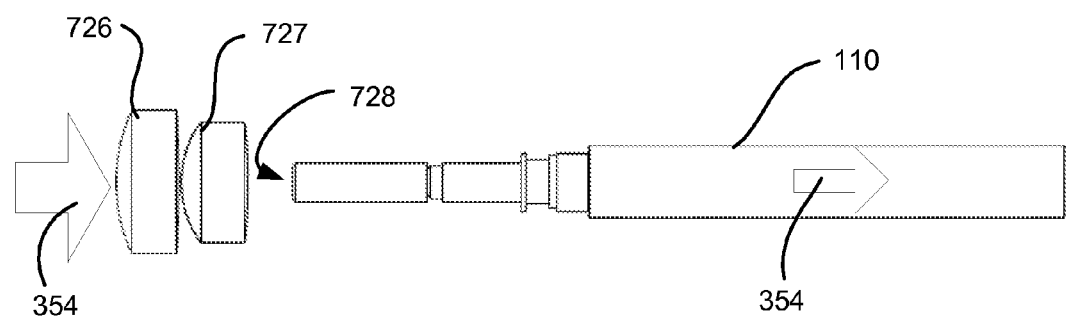
FIG. 7B shows a top view of the optical components of the output optics subsystem of FIG. 7A.

As shown in FIG. 7B, output optics 356 includes two plano-convex lenses 726, 727. Plano-convex lenses 726, 727 receive the collimated combined beam of light 354 from all the light sources of solid state illumination engine 100, focuses the combined beam 354 and directs it into the aperture 728 of light guide 110. Light guide 110 transmits the combined beam to an optical instrument such as a microscope or endoscope. As described with respect to FIGS. 2A-2C, above, the distal end of light guide 110 may be coupled to a microscope using the adjustable collimator of the present invention.

Figure 7C:
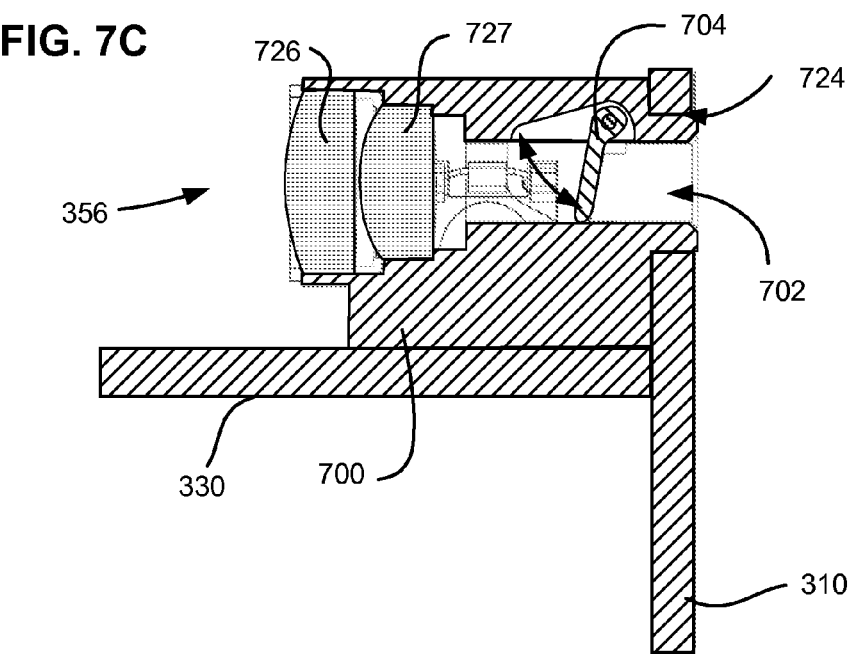
FIGS. 7C and 7D show different sectional views of the output optics subsystem of FIG. 7A.
Figure 7D:
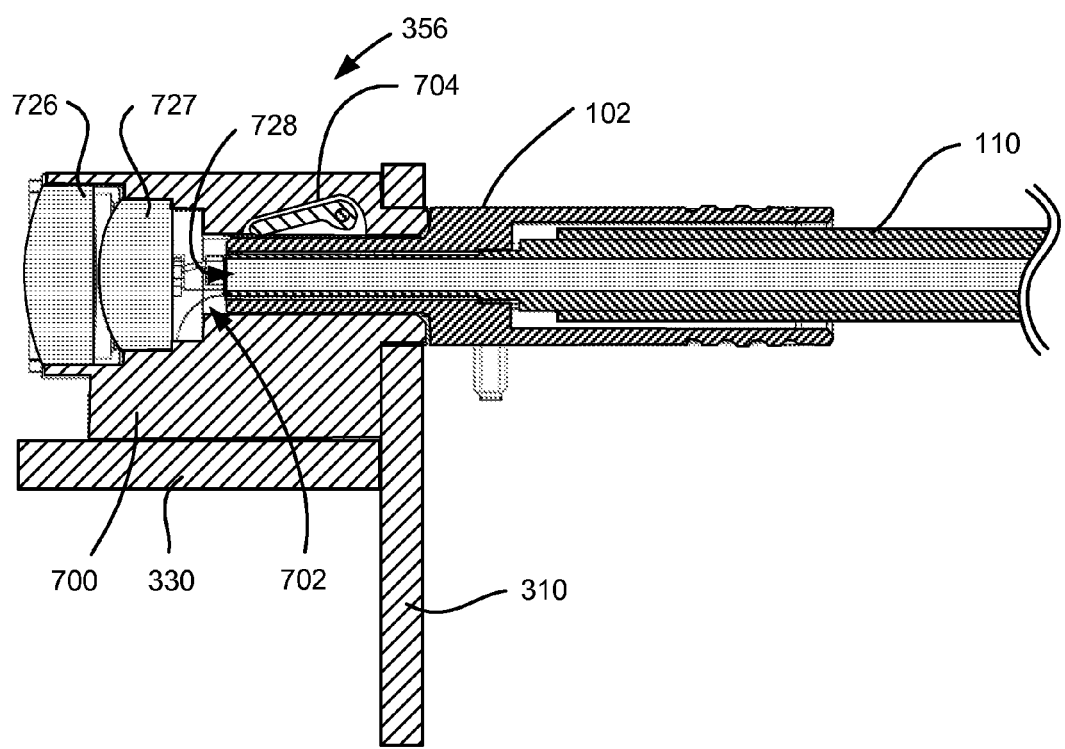

FIGS. 7C and 7D are sectional views of output optics 356 illustrating attachment of a light guide 110. FIG. 7C shows output optics without light guide 110 in place. As shown in FIG. 7C, light guide 110 includes a housing 700 which defines a lumen 702. Housing 700 is mounted to platform 330. Housing 700 projects through aperture 724 in front plate 310 such that lumen 702 is accessible from the exterior of solid state illumination engine 100. As shown in FIG. 7C, a safety flap 704 occludes lumen 702 to prevent the exit of light or entry of contaminants through lumen 702 when light guide 110 is not connected. Safety flap 704 is spring loaded such that it occludes lumen 702 automatically upon removal of a light guide 110. Safety flap 704 pivots out of the way when a light guide 110 is inserted. One or more limit sensors (not shown) are coupled to safety flap 704 to sense the position of safety flap 704 (and thus the presence or absence of a light guide) and provide such information to controller board 338.

As shown in FIG. 7D, light guide 110 is received in an adapter 102 which connects light guide 110 to output optics 356 and positions light guide 110 such that the aperture 728 of the light guide 110 is correctly positioned to receive the focused combined beam of light. When adapter 102 and light guide 110 are inserted into lumen 702 of housing 700, safety flap 704 pivots out of the way. Aperture 728 is positioned coaxial with plano-convex lenses 726, 727 such that the combined beam of light is focused into aperture 728 of light guide 110. Light guide 110 transmits the combined beam to an optical instrument such as a microscope or endoscope.

The illuminations systems and components thereof described herein may, with suitable adaptation, find application in a range of applications including: life science applications which cover a range of white light and/or fluorescence analyses and quantitation; microscopy; fluorescence microscopy; high content screening; genetic expression analysis; digital pathology; and endoscopy.

Other features, aspects and objects of the invention can be obtained from a review of the figures and the claims. It is to be understood that other embodiments of the invention can be developed and fall within the spirit and scope of the invention and claims.

The invention claimed is:

1. An adjustable collimator for coupling a light guide to a microscope, the adjustable collimator comprising:
   a housing having a housing bore having a longitudinal axis;
   a housing flange adapted to mount the housing the microscope;
   a housing lens secured in the housing bore aligned with the longitudinal axis;
   a sleeve slidingly received in the housing bore;
   a sleeve bore aligned with the longitudinal axis;
   a sleeve lens secured in the sleeve bore aligned with the longitudinal axis;
   a sleeve fastener for adjustably securing the position of the sleeve within the housing bore such that a first distance between the housing lens and sleeve lens may be adjusted and fixed in order to vary a size of an illumination spot provided from said light guide via the adjustable collimator to the microscope; and
   a light guide fastener for adjustably securing said light guide within the sleeve bore such that a second distance between an output aperture of said light guide and the sleeve lens may be adjusted and fixed, wherein adjustment of said second distance between the output aperture of said light guide and the sleeve lens is adapted to generate a uniform and focused illumination field in said microscope.

2. The adjustable collimator of claim 1, in combination with a the microscope, wherein the housing flange of the adjustable collimator is secured to a lamphouse mount of the microscope such that the longitudinal axis of the housing bore is aligned with an optical train of the microscope.

3. The adjustable collimator of claim 1 in combination with a light guide, wherein an output aperture of the light guide is received in the sleeve bore and the light guide is secured by the light guide fastener within the sleeve bore such that the second distance between the output aperture of a light guide and the sleeve lens may be adjusted and fixed.

4. The adjustable collimator of claim 1, wherein the adjustable collimator is configured such that light transmitted from said light guide to the microscope is divergent over said first distance between said sleeve lens and said housing lens.

5. The adjustable collimator of claim 1, wherein the housing lens is an achromat lens and the sleeve lens is an achromat lens.

6. The adjustable collimator of claim 1, wherein the sleeve fastener comprises a screw which passes through a slot in the housing and engages a threaded hole in the sleeve whereby tightening of the screw secures the position of the sleeve within the housing bore such that a first distance between the housing lens and sleeve lens may be adjusted and fixed.

7. The adjustable collimator of claim 1, wherein the light guide fastener comprises a screw which passes through a slot in the housing, engages a threaded hole in the sleeve, and intersects the sleeve bore, whereby tightening of the screw secures the light guide within the sleeve bore such that the second distance between the output aperture of the light guide and the sleeve lens may be adjusted and fixed.

8. A microscope comprising:
   an objective lens;
   a lamphouse mount;

an optical train which transmits light from the lamphouse mount to the objective lens; and an adjustable collimator for coupling a light guide to the optical train of the microscope, wherein the adjustable collimator includes,
a housing secured to the lamphouse mount,
a housing bore, in the housing, the housing bore having a longitudinal axis aligned with the optical train,
a housing lens secured in the housing bore aligned with the longitudinal axis,
a sleeve slidingly received in the housing bore,
a sleeve bore aligned with the longitudinal axis,
a sleeve lens secured in the sleeve bore aligned with the longitudinal axis,
a sleeve fastener for adjustably securing the position of the sleeve within the housing bore such that a first distance between the housing lens and sleeve lens may be adjusted and fixed in order to vary a size of an illumination spot provided from said light guide via the adjustable collimator to the microscope; and
a light guide fastener for adjustably securing said light guide within the sleeve bore such that a second distance between an output aperture of said light guide and the sleeve lens may be adjusted and fixed, wherein adjustment of said second distance between the output aperture of said light guide and the sleeve lens is adapted to generate a uniform and focused illumination field in said microscope.

9. The microscope of claim 8 in combination with a light guide, wherein an output aperture of the light guide is received in the sleeve bore and the light guide is secured by the light guide fastener within the sleeve bore such that the second distance between the output aperture of a light guide and the sleeve lens may be adjusted and fixed.

10. The microscope wherein the adjustable collimator is configured such that light transmitted from said light guide to the microscope is divergent over said first distance between said sleeve lens and said housing lens.

11. The microscope of claim 8, wherein the housing lens is an achromat lens and the sleeve lens is an achromat lens.

12. The microscope of claim 8, wherein the sleeve fastener comprises a screw which passes through a slot in the housing and engages a threaded hole in the sleeve whereby tightening of the screw secures the position of the sleeve within the housing bore such that the first distance between the housing lens and sleeve lens may be adjusted and fixed.

13. The microscope of claim 8, wherein the light guide fastener comprises a screw which passes through a slot in the housing, engages a threaded hole in the sleeve, and intersects the sleeve bore, whereby tightening of the screw secures the light guide within the sleeve bore such that the second distance between the output aperture of the light guide and the sleeve lens may be adjusted and fixed.

14. An adjustable collimator for coupling a light guide to a microscope, the adjustable collimator comprising:
a housing having a housing bore having a longitudinal axis;
a housing flange adapted to mount the housing to said microscope;
a first lens secured in the housing bore aligned with the longitudinal axis;
a second lens aligned with the longitudinal axis;
an adjustment mechanism for adjustably securing the second lens such that a first distance between the first lens and second lens may be adjusted and fixed in order to vary a size of an illumination spot provided from said light guide via the adjustable collimator to the microscope; and
a light guide mount for adjustably securing said light guide such that said light guide is aligned with the longitudinal axis and a second distance between an output aperture of said light guide and the second lens may be adjusted and fixed, wherein adjustment of said second distance between the output aperture of said light guide and the sleeve lens is adapted to generate a uniform and focused illumination field in said microscope.

15. The adjustable collimator of claim 14 in combination with a light guide, wherein an output aperture of the light guide is received in the light guide mount such that the second distance between the output aperture of a light guide and the sleeve lens may be adjusted and fixed.

16. The adjustable collimator of claim 14, wherein the housing lens is an achromat lens and the sleeve lens is an achromat lens.

17. The adjustable collimator of claim 14, wherein the adjustable collimator is configured such that light transmitted from said light guide to the microscope is divergent over said first distance between said second lens and said first lens.

18. The adjustable collimator of claim 14, wherein the light guide mount comprises a sleeve slidingly received in the housing bore, and wherein the second lens is attached to the sleeve.

* * * * *